United States Patent
Georgin et al.

(10) Patent No.: US 11,932,222 B2
(45) Date of Patent: Mar. 19, 2024

(54) SYSTEMS AND METHODS FOR LOW SPEED BRAKING OPERATION

(71) Applicant: GOODRICH CORPORATION, Charlotte, NC (US)

(72) Inventors: Marc Georgin, Dayton, OH (US); Phillip E. Cooley, Kettering, OH (US); Michael Abbott, Tempe, AZ (US)

(73) Assignee: GOODRICH CORPORATION, Charlotte, NC (US)

( * ) Notice: Subject to any disclaimer, the term of this patent is extended or adjusted under 35 U.S.C. 154(b) by 577 days.

(21) Appl. No.: 17/013,075

(22) Filed: Sep. 4, 2020

(65) Prior Publication Data

US 2022/0073040 A1    Mar. 10, 2022

(51) Int. Cl.
| | |
|---|---|
| *B60T 8/17* | (2006.01) |
| *B60T 7/04* | (2006.01) |
| *B60T 7/06* | (2006.01) |
| *B60T 8/171* | (2006.01) |
| *B60T 8/32* | (2006.01) |

(52) U.S. Cl.
CPC ............ *B60T 8/1703* (2013.01); *B60T 7/042* (2013.01); *B60T 7/06* (2013.01); *B60T 8/171* (2013.01); *B60T 8/325* (2013.01); *B60T 8/326* (2013.01)

(58) Field of Classification Search
CPC ........ B60T 8/1703; B60T 8/175; B60T 8/176; B60T 2270/10; B60T 13/662; B60T 7/042; B60T 7/06; B60T 8/171; B60T 8/325; B60T 8/326; B64C 25/46
See application file for complete search history.

(56) References Cited

U.S. PATENT DOCUMENTS

| | | | |
|---|---|---|---|
| 6,142,585 | A | 11/2000 | Gowan et al. |
| 6,178,370 | B1 * | 1/2001 | Zierolf .................... B64C 25/44 701/75 |
| 7,286,909 | B2 | 10/2007 | Darke |
| 8,244,428 | B2 | 8/2012 | Griffith |
| 8,965,657 | B2 | 2/2015 | Georgin et al. |
| 9,857,272 | B2 | 1/2018 | Summers et al. |
| 10,073,811 | B2 | 9/2018 | Swearingen et al. |
| 10,472,054 | B2 | 11/2019 | Cahill |
| 10,525,945 | B2 | 1/2020 | Ayichew et al. |
| 2001/0032045 | A1 | 10/2001 | Hano et al. |

(Continued)

FOREIGN PATENT DOCUMENTS

| | | |
|---|---|---|
| DE | 102006020471 | 11/2007 |
| EP | 3401173 | 11/2018 |

OTHER PUBLICATIONS

European Patent Office; Extended European Search Report dated Feb. 2, 2022 in Application No. 21192907.0.

(Continued)

*Primary Examiner* — Faris S Almatrahi
*Assistant Examiner* — Andrew J Cromer
(74) *Attorney, Agent, or Firm* — SNELL & WILMER L.L.P.

(57) ABSTRACT

A brake control system of the present disclosure includes an accelerometer coupled to an axle. A brake control unit is configured to receive an axle acceleration signal indicative of an axle acceleration from the accelerometer, and decrease a braking command pressure in response to the axle acceleration being greater than a threshold acceleration value.

17 Claims, 6 Drawing Sheets

(56) References Cited

U.S. PATENT DOCUMENTS

2005/0251306 A1* 11/2005 Gowan .................. G01P 3/443
 701/71
2015/0012153 A1   1/2015 Metzger, Jr. et al.
2018/0297564 A1* 10/2018 Ayichew ................ B60T 8/172
2019/0322255 A1  10/2019 Krucinski et al.

OTHER PUBLICATIONS

European Patent Office, European Office Action dated Feb. 1, 2023 in Application No. 21192907.0.

* cited by examiner

SYSTEMS AND METHODS FOR LOW SPEED BRAKING OPERATION

FIELD

In general, the arrangements disclosed herein relate to braking systems and methods. More specifically, they relate to systems and methods for brake control suitable for use in aircraft.

BACKGROUND

A servo valve is used in brake control systems to vary hydraulic power to braking systems (e.g., a brake actuator) to control brake pressures and aircraft deceleration. The servo valve may receive an electric current for varying the hydraulic pressure supplied to the braking systems. Typical braking systems operate in a closed-loop mode and utilize pressure feedback signals for adjusting the electric current supplied to the servo valve to maintain the braking pressure at the commanded pressure. Antiskid control utilizes wheel speed feedback signals to prevent the vehicles wheels from locking up and/or skidding during a braking maneuver.

SUMMARY

A brake control system is disclosed, comprising an accelerometer coupled to an axle, a servo valve configured to receive a hydraulic fluid and provide the hydraulic fluid to apply a braking force to a wheel via a hydraulic line, and a brake control unit in electronic communication with the servo valve. The brake control unit is configured to receive an axle acceleration signal indicative of an axle acceleration from the accelerometer, and decrease a braking command pressure in response to the axle acceleration being greater than a threshold acceleration value.

In various embodiments, the brake control unit is further configured to increase the braking command pressure at a predetermined rate.

In various embodiments, the brake control unit is further configured to determine whether the braking command pressure is equal to or greater than a pedal command pressure, and switch from using the braking command pressure to using the pedal command pressure, in response to the braking command pressure being equal to or greater than the pedal command pressure.

In various embodiments, the brake control unit is further configured to determine whether an aircraft speed is less than a threshold speed value, and determine whether the axle acceleration is greater than the threshold acceleration value, in response to the aircraft speed being less than the threshold speed value.

In various embodiments, the brake control unit is further configured to decrease the braking command pressure to a contact pressure in response to the axle acceleration being greater than the threshold acceleration value.

In various embodiments, the brake control unit is further configured to monitor a brake pedal position to determine whether at least one of i) a pedal deflection is greater than a threshold deflection value, ii) a pedal deflection is decreasing, iii) a pedal apply rate is greater than a threshold apply rate. The brake control unit may be further configured to switch from using the braking command pressure to using a pedal command pressure, in response to at least one of the criteria in i)-iii) being true.

In various embodiments, the brake control unit is further configured to continue increasing the braking command pressure at the predetermined rate, in response to the braking command pressure being less than the pedal command pressure.

A method for brake control is disclosed, comprising receiving, by a brake control unit, an axle acceleration signal indicative of an axle acceleration from an accelerometer, and decreasing, by the brake control unit, a braking command pressure in response to the axle acceleration being greater than a threshold acceleration value.

In various embodiments, the method further comprises increasing, by the brake control unit, the braking command pressure at a predetermined rate.

In various embodiments, the method further comprises determining, by the brake control unit, whether the braking command pressure is equal to or greater than a pedal command pressure, and switching, by the brake control unit, from using the braking command pressure to using the pedal command pressure, in response to the braking command pressure being equal to or greater than the pedal command pressure.

In various embodiments, the method further comprises determining, by the brake control unit, whether an aircraft speed is less than a threshold speed value, and determining, by the brake control unit, whether the axle acceleration is greater than the threshold acceleration value, in response to the aircraft speed being less than the threshold speed value.

In various embodiments, the method further comprises decreasing, by the brake control unit, the braking command pressure to a contact pressure in response to the axle acceleration being greater than the threshold acceleration value.

In various embodiments, the method further comprises monitoring, by the brake control unit, a brake pedal position to determine whether at least one of i) a pedal deflection is greater than a threshold deflection value, ii) a pedal deflection is decreasing, and iii) a pedal apply rate is greater than a threshold apply rate. The method may further comprise switching, by the brake control unit, from using the braking command pressure to using a pedal command pressure, in response to at least one of the criteria in i)-iii) being true.

A brake control system that is configured for use with an aircraft is disclosed, comprising a brake control unit comprising a processor, and a tangible, non-transitory memory configured to communicate with the processor. The tangible, non-transitory memory has instructions stored thereon that, in response to execution by the processor, cause the brake control unit to perform operations comprising receiving an axle acceleration signal indicative of an axle acceleration from an accelerometer, and decreasing a braking command pressure in response to the axle acceleration being greater than a threshold acceleration value.

In various embodiments, the instructions cause the brake control unit to perform further operations comprising increasing the braking command pressure at a predetermined rate.

In various embodiments, the instructions cause the brake control unit to perform further operations comprising determining whether the braking command pressure is equal to or greater than a pedal command pressure, and switching from using the braking command pressure to using the pedal command pressure, in response to the braking command pressure being equal to or greater than the pedal command pressure.

In various embodiments, the instructions cause the brake control unit to perform further operations comprising determining whether an aircraft speed is less than a threshold speed value, and determining whether the axle acceleration is greater than the threshold acceleration value, in response to the aircraft speed being less than the threshold speed value.

In various embodiments, the brake control unit is configured to decrease the braking command pressure to a contact pressure in response to the axle acceleration being greater than the threshold acceleration value.

In various embodiments, the instructions cause the brake control unit to perform further operations comprising monitoring a brake pedal position to determine whether at least one of i) a pedal deflection is greater than a threshold deflection value, ii) a pedal deflection is decreasing, and iii) a pedal apply rate is greater than a threshold apply rate, and switching from using the braking command pressure to using a pedal command pressure, in response to at least one of the criteria in i)-iii) being true.

In various embodiments, the instructions cause the brake control unit to perform further operations comprising increasing the braking command pressure at the predetermined rate, in response to the braking command pressure being less than the pedal command pressure.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The accompanying drawings illustrate various embodiments employing the principles described herein and are a part of this specification. The illustrated embodiments are meant for description only, and they do not limit the scope of the claims, and in which:

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein described without departing from the scope and spirit of the disclosure. Thus, the detailed description herein is presented for purposes of illustration only and not of limitation.

Provided herein, according to various embodiments, are systems, methods, and devices for brake control, such as within a braking system of an aircraft. While numerous details are included herein pertaining to aircraft components, such as brake components, the systems and methods disclosed herein can be applied to other systems with other servo valves and the like.

As used herein, the term "weight-on-wheels (WOW) condition" means that at least a portion of the aircraft is supported on the ground via the landing gear with the associated tire in contact with a ground surface.

Brake control systems and methods, as disclosed herein, include an acceleration sensor (e.g., an accelerometer) coupled to a landing gear axle. A BCU may receive an acceleration sensor signal indicative of an acceleration of the axle to control braking of the aircraft. In this manner, acceleration oscillations can be monitored by the BCU at lower aircraft speeds, when wheel speed signals can become unreliable and as a result antiskid is turned off. In various embodiments, in response to the axle acceleration increasing above a predetermined level, the BCU will relieve brake pressure by applying contact pressure and slowly reapply brake pressure in order to limit or eliminate these oscillations and avoid damage, noise, and/or discomfort inside the aircraft as it comes to a stop. The method may also provide an override feature in case the pilot actuates the brakes abruptly, e.g., to avoid a collision.

Figure 1A:
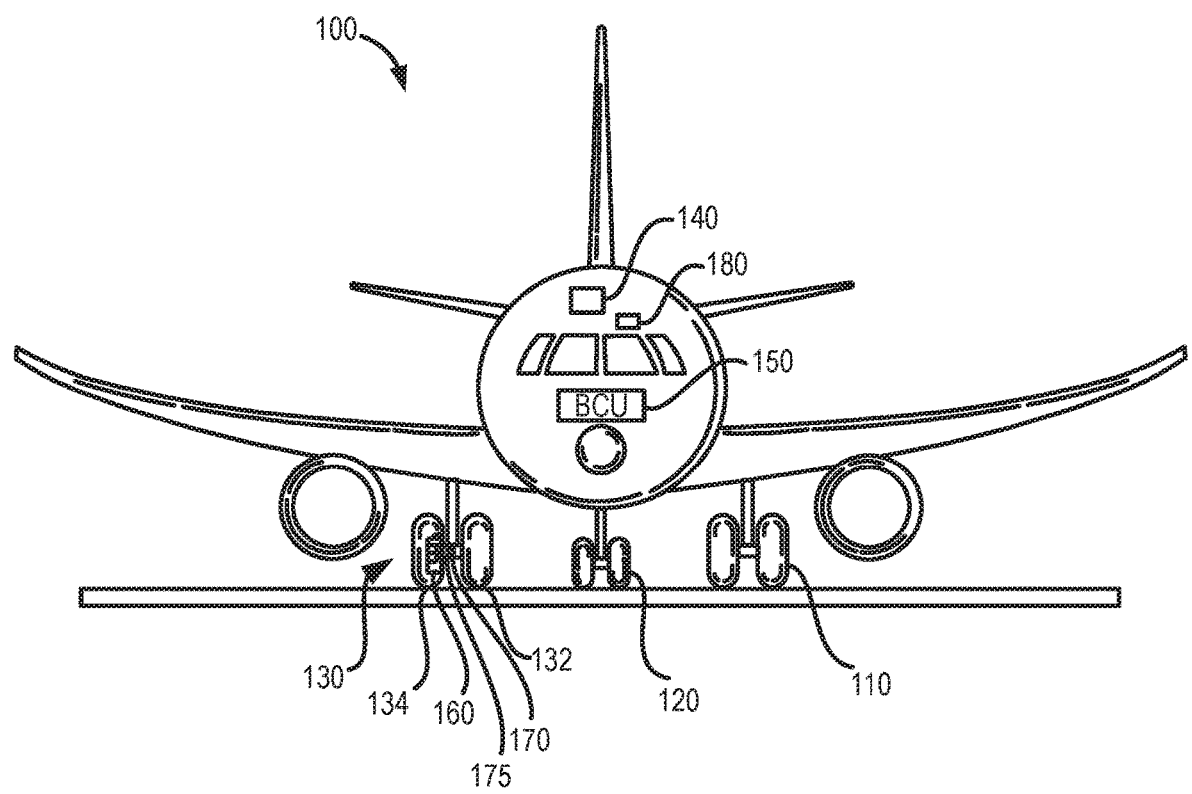
FIG. 1A illustrates an aircraft having multiple landing gear and brakes, in accordance with various embodiments.

Referring now to FIG. 1A, an aircraft 100 includes multiple landing gear systems, including a first landing gear 110, second landing gear 120, and third landing gear 130. The first landing gear 110, second landing gear 120, and third landing gear 130 each include one or more wheel assemblies. For example, the third landing gear 130 includes an inner wheel assembly 132 and an outer wheel assembly 134. The first landing gear 110, second landing gear 120, and third landing gear 130 support the aircraft 100 when the aircraft 100 is not flying, thereby allowing the aircraft 100 to take off, land, and taxi without damaging the aircraft 100. In various embodiments, the second landing gear 120 is also a nose landing gear for the aircraft 100, and oftentimes, one or more of the first landing gear 110, second landing gear 120, and third landing gear 130 are operationally retractable into the aircraft 100 when the aircraft 100 is in flight and/or airborne.

In various embodiments, the aircraft 100 further includes an avionics unit 140, which includes one or more controllers (e.g., processors) and one or more tangible, non-transitory memories capable of implementing digital or programmatic logic. In various embodiments, for example, the one or more controllers are one or more of a general purpose processor, digital signal processor (DSP), application specific integrated circuit (ASIC), field programmable gate array (FPGA), or other programmable logic device, discrete gate, transistor logic, or discrete hardware components, or any various combinations thereof or the like. In various embodiments, the avionics unit 140 controls, at least various parts of, the flight of, and operation of various components of, the aircraft 100. For example, the avionics unit 140 controls various parameters of flight, such as an air traffic management systems, auto-pilot systems, auto-thrust systems, crew alerting systems, electrical systems, electronic checklist systems, electronic flight bag systems, engine systems flight control systems, environmental systems, hydraulics systems, lighting systems, pneumatics systems, traffic avoidance systems, trim systems, and the like.

In various embodiments, the aircraft 100 further includes a BCU 150. With brief reference now to FIG. 1B, the BCU 150 includes one or more controllers 154 (e.g., processors) and one or more tangible, non-transitory memories 156 capable of implementing digital or programmatic logic. In various embodiments, for example, the one or more controllers 154 are one or more of a general purpose processor, DSP, ASIC, FPGA, or other programmable logic device, discrete gate, transistor logic, or discrete hardware components, or any various combinations thereof or the like, and the one or more memories 156 store instructions that are implemented by the one or more controllers 154 for performing various functions, such as monitoring a health status of a servo valve, as will be discussed herein. In various embodiments, the BCU 150 controls, at least various parts of, the braking of the aircraft 100. For example, the BCU 150 controls various parameters of braking, such as manual brake control, automatic brake control, antiskid braking, locked wheel protection, touchdown protection, park capability, gear retraction braking, and the like. The BCU 150 may further include hardware 158 capable of performing various logic using discreet power signals received from various aircraft systems.

Referring again more particularly to FIG. 1A, the aircraft 100 further includes one or more brakes coupled to each wheel assembly. For example, a brake 160 is coupled to the outer wheel assembly 134 of the third landing gear 130 of the aircraft 100. In operation, the brake 160 applies a braking force to the outer wheel assembly 134 upon receiving a brake command, such as from the BCU 150. In various embodiments, the outer wheel assembly 134 of the third landing gear 130 of the aircraft 100 comprises any number of wheels.

The aircraft 100 further includes an axle 170 associated with each wheel assembly. In various embodiments, the aircraft 100 further includes one or more acceleration sensors associated with each wheel assembly. More specifically, the aircraft 100 includes one or more acceleration sensors coupled to each axle 170. For example, an accelerometer 175 is coupled to the axle 170 of the third landing gear 130 of the aircraft 100. In operation, the accelerometer 175 provides feedback to the BCU 150 for use during low speed braking operations. Accelerometer 175 may detect accelerations in the fore and aft directions. In various embodiments, the term "low speed" as used herein refers to speeds of less than ten knots. In various embodiments, the third landing gear 130 of the aircraft 100 comprises any number of axles. It should be understood that the accelerometer 175 may be coupled to any suitable component of the landing gear for detecting axle oscillations, such as a bogie beam for example. It should be further understood that the aircraft 100 may include acceleration sensors associated with each of the first landing gear 110, second landing gear 120, and third landing gear 130.

Figure 1B:
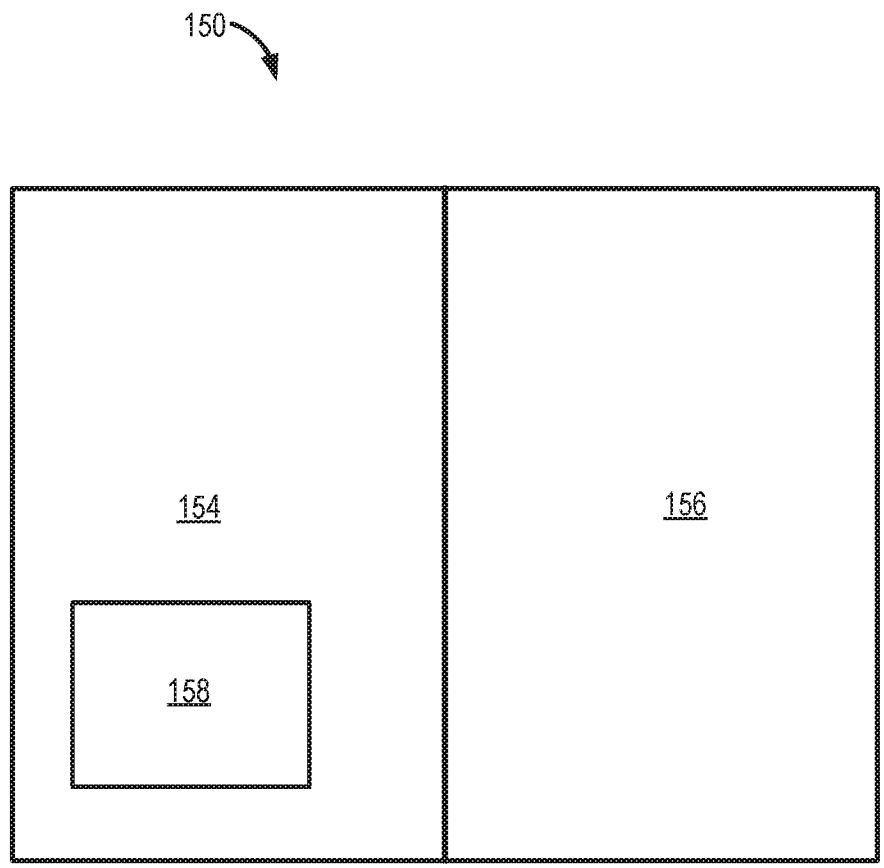
FIG. 1B is a block diagram of a brake control unit (BCU) of the aircraft of FIG. 1A, in accordance with various embodiments.
Figure 1C:
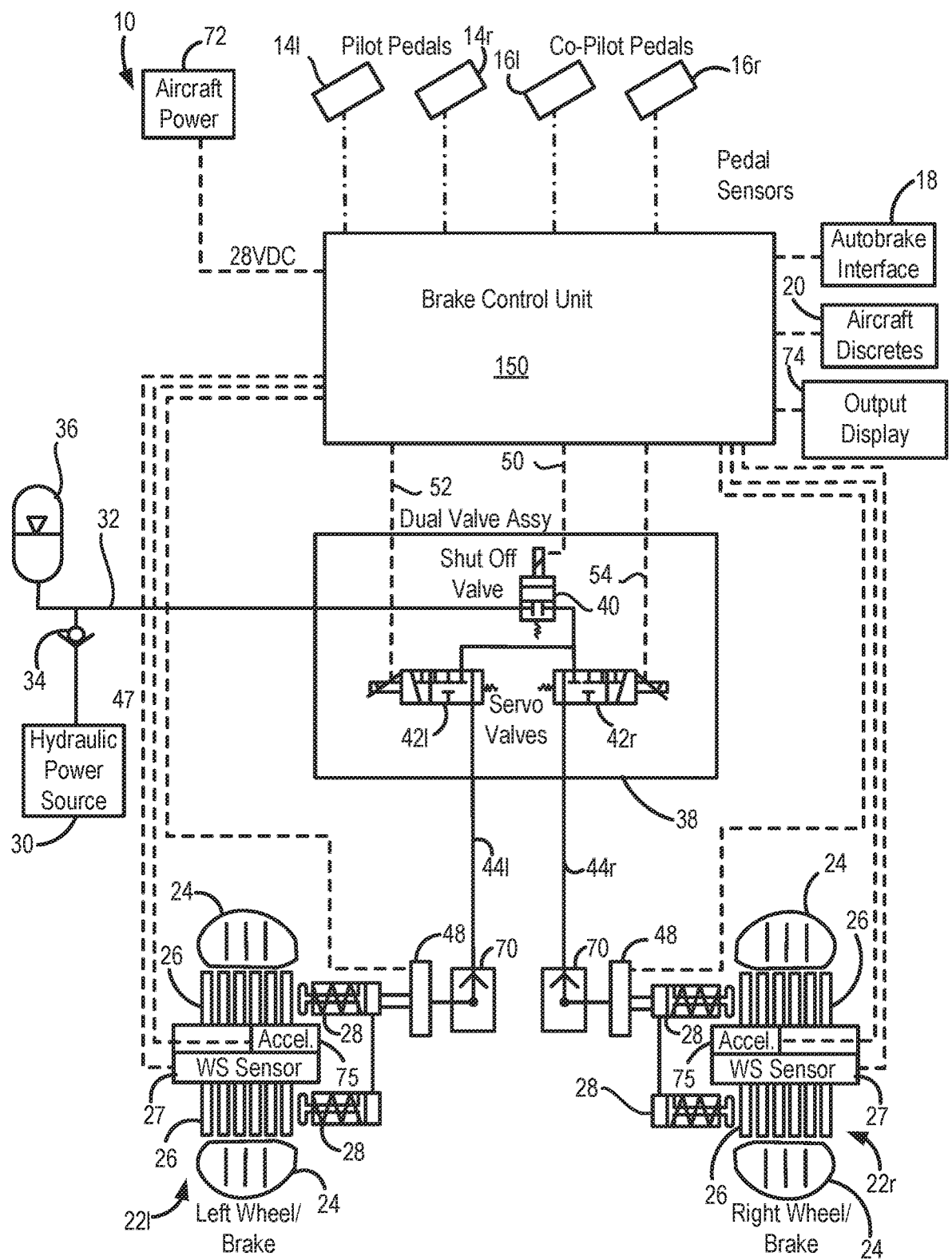
FIG. 1C is a functional diagram of a braking system of the aircraft of FIG. 1A, in accordance with various embodiments.

Referring now also to FIG. 1C, including with continued reference to FIGS. 1A and 1B as well, a braking system 10 is shown in accordance with an embodiment of the inventive arrangements. The braking system 10 includes the brake control unit (BCU) 150 of FIGS. 1A and 1B, which is programmed to control the various braking functions described herein. In various embodiments, the braking system 10 enables the aircraft 100 to brake, thereby slowing aircraft 100 when on the ground. However, it will be appreciated that the braking system 10 may also be used in connection with other types of vehicles without departing from the scope of the inventive arrangements.

As described herein, the braking system generally includes, inter alia, a hydraulic power source 30 acting through i) a left wheel servo valve 42l to apply hydraulic pressure through a left hydraulic line 44l and shuttle valve 70 to apply a braking force to actuators 28 of a left wheel/brake assembly 22l; and ii) a right wheel servo valve 42r to apply hydraulic pressure through a right hydraulic line 44r and shuttle valve 70 to apply a braking force to actuators 28 of a right wheel/brake assembly 22r. First pressure sensors 48 may be intermediate, and in fluid communication with, the actuators 28 and shuttle valves 70 of the left wheel/brake assembly 22l and right wheel/brake assembly 22r.

In various embodiments, the shuttle valves 70, first pressure sensors 48, and actuators 28 may be common to both a primary braking system and a non-primary braking system of the braking system 10 of the aircraft 100.

In various embodiments of the braking system, the BCU 150 receives brake command signals from a left pilot brake pedal 14l and a right pilot brake pedal 14r and/or a left co-pilot brake pedal 16l and a right co-pilot brake pedal 16r. The brake command signals from the left pilot brake pedal 14l and the right pilot brake pedal 14r and/or the left co-pilot brake pedal 16l and the right co-pilot brake pedal 16r are indicative of a desired amount of braking. In various embodiments, the left pilot brake pedal 14l may provide a brake command signal to the BCU 150 that is indicative of a degree of travel of the left pilot brake pedal 14l, and thus the amount of desired braking by the left wheel/brake assembly 22l. Similarly, the remaining right pilot brake pedal 14r, the left co-pilot brake pedal 16l, and the right co-pilot brake pedal 16r each provide a brake command signal to the BCU 150 that is indicative of a degree of travel of the right pilot brake pedal 14r, the left co-pilot brake pedal 16l, and the right co-pilot brake pedal 16r, respectively, and thus the amount of desired braking by the left wheel/brake assembly 22l or right wheel/brake assembly 22r. In various embodiments, each brake pedal may have a corresponding transducer respectively serving the BCU 150 to provide the brake command signal to the BCU 150. However, any suitable brake pedal configuration is within the scope of the present disclosure.

In addition, the BCU 150 receives control signals from an auto-brake interface 18 for performing auto-brake and rejected take-off (RTO) braking functions. The BCU 150 also receives a series of discrete control signals associated with the aircraft 100, such as engine parameters, aircraft temperatures, or aircraft pressures for example, generally represented as aircraft discretes 20, for providing braking control thereof.

In various embodiments, the BCU 150 controls braking of the left wheel/brake assembly 22l and the right wheel/brake assembly 22r, as noted above. The left wheel/brake assembly 22l includes one or more wheels 24 and brake stacks 26. A plurality of actuators 28 may be provided for exerting braking forces on the brake stacks 26 in order to brake the wheels 24. The right wheel/brake assembly 22r has a similar, mirrored configuration. Both the left wheel/brake assembly 22l and the right wheel/brake assembly 22r also include, in various embodiments, wheel speed sensors 27 that provide wheel speed information to the BCU 150 for carrying out brake control operations.

In various embodiments of the braking system, a hydraulic power source 30 serves as a primary brake power supply within the braking system 10. In various embodiments, a primary hydraulic line 32 from the hydraulic power source 30 includes a check valve 34 and an accumulator 36. In various embodiments, the primary hydraulic line 32 is input into a brake control module (BCM) 38 included within the braking system 10. The BCM 38 includes a shutoff valve 40 through which the primary hydraulic line 32 supplies hydraulic fluid to the left wheel servo valve 42*l* and the right wheel servo valve 42*r*. However, separate BCMs may be provided for individually supplying hydraulic fluid to the left wheel servo valve 42*l* and the right wheel servo valve 42*r* without departing from the spirit and scope of the present disclosure. In various embodiments, hydraulic fluid from the left wheel servo valve 42*l* and the right wheel servo valve 42*r* is respectively provided through a left hydraulic line 44*l* and a right hydraulic line 44*r* to apply the braking force to the wheels 24 during a braking operation.

During primary braking operations, hydraulic fluid pressure through the left hydraulic line 44*l* and the right hydraulic line 44*r* respectively passes to the corresponding actuators 28 via one or more of the corresponding shuttle valves 70. Thus, if the braking system 10 is functioning in the primary braking mode, the shutoff valve 40 is open to the left hydraulic line 44*l* and the right hydraulic line 44*r*, and the BCU 150 controls the amount of hydraulic pressure that is delivered to the wheels 24 respectively via the left wheel servo valve 42*l* and the right wheel servo valve 42*r* acting through the corresponding left hydraulic line 44*l* and right hydraulic line 44*r*.

In various embodiments, the shutoff valve 40, the left wheel servo valve 42*l*, and the right wheel servo valve 42*r* are coil valves. In various embodiments, the shutoff valve 40 receives a shutoff valve control signal on a bus 50 from the BCU 150. Similarly, the left wheel servo valve 42*l* may receive a servo valve control signal on a bus 52 from the BCU 150. Likewise, the right wheel servo valve 42*r* may receive a servo valve control signal on a bus 54 from the BCU 150. The servo valve control signal may comprise an electric current signal. Stated differently, electric current supplied to left wheel servo valve 42*l* and/or right wheel servo valve 42*r* may be varied to adjust braking pressure applied at the brake stacks 26 via actuators 28.

In various embodiments, the braking system 10 includes first pressure sensors 48 for monitoring the hydraulic pressure in the left hydraulic line 44*l* and the right hydraulic line 44*r* and providing such information back to the BCU 150. In addition, power to the BCU 150 is provided from an aircraft power source 72, such as a DC power source within the aircraft 100. In various embodiments, power is transmitted from the aircraft power source 72 to the BCU 150.

In various embodiments, the braking system 10 further includes an output device and/or output display 74 coupled to the BCU 150. The output device and/or output display 74 is configured to communicate information to the pilot, co-pilot, and/or maintenance crew relating to the braking operations. For example, in various embodiments, the output device and/or output display 74 includes a display, a speaker, a network access device, and/or the like that sends a message to a remote terminal, or the like. In various embodiments, the BCU 150 controls the output device and/or output display 74 to output the health status of the braking system 10, including the various components thereof.

In various embodiments, the braking system 10 may be activated by the left pilot brake pedal 14*l*, the right pilot brake pedal 14*r*, the left co-pilot brake pedal 16*l*, and the right co-pilot brake pedal 16*r* respectively acting through the shutoff valve 40, the left wheel servo valve 42*l*, the right wheel servo valve 42*r*, the left hydraulic line 44*l*, and the right hydraulic line 44*r*.

The braking system 10 utilizes the shutoff valve 40 in-line with the left wheel servo valve 42*l* and the right wheel servo valve 42*r* to provide a level of redundancy that ensures a single valve failure cannot cause inadvertent braking. In order for the braking force to be applied by the braking system 10 to the left wheel/brake assembly 22*l* and the right wheel/brake assembly 22*r*, the shutoff valve 40 must be open along with at least one of the left wheel servo valve 42*l* and the right wheel servo valve 42*r*. To provide a redundancy so that the brakes can be operated when commanded, each of the valves (shutoff and servo) may contain dual control coils with one coil for different dedicated channels in the BCU 150, in accordance with various embodiments.

Both the left wheel/brake assembly 22*l* and the right wheel/brake assembly 22*r* also include, in various embodiments, accelerometers 75 that provide axle oscillation information to the BCU 150 for carrying out brake control operations. Although illustrated as having one accelerometer for each the left wheel/brake assembly 22*l* and the right wheel/brake assembly 22*r*, it is contemplated that a single accelerometer 75 may be utilized for carrying out brake control operations for both the left wheel/brake assembly 22*l* and the right wheel/brake assembly 22*r*. In various embodiments, accelerometer 75 is packaged by itself in the axle of the landing gear. In various embodiments, accelerometer 75 is packaged as a combo with the wheel speed sensor 27.

Figure 2:
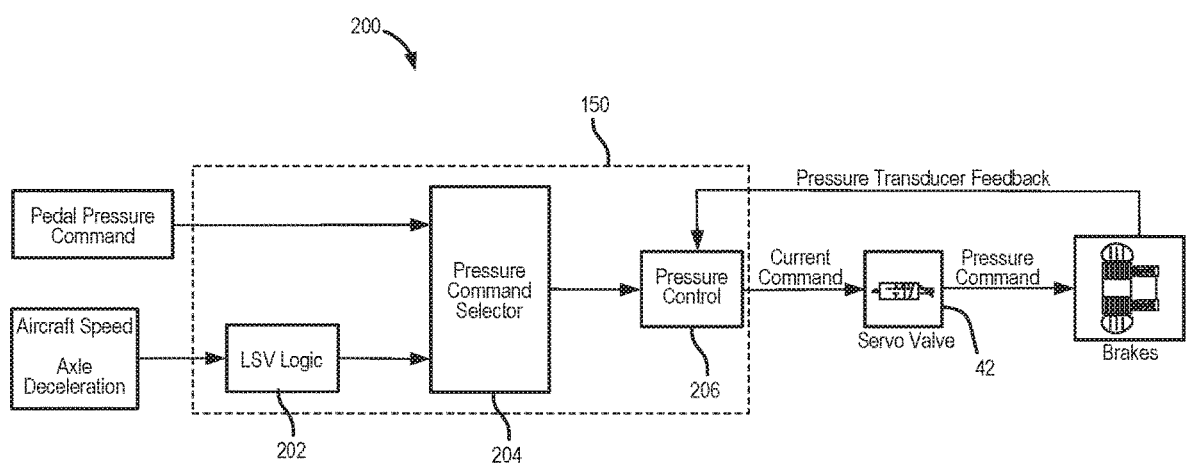
FIG. 2 is a schematic view of a low speed brake control architecture for a BCU, in accordance with various embodiments.

Referring now to FIG. 2, a low speed brake control architecture 200 for is illustrated, in accordance with various embodiments. Various logic in low speed brake control architecture 200 may be performed by BCU 150 (see FIG. 1C). Low speed brake control architecture 200 may comprise a low speed vibration (LSV) compensation logic 202. In operation, LSV compensation logic 202 receives an aircraft speed signal indicating a speed of an aircraft, and an axle acceleration signal indicating an acceleration of an axle of the aircraft. As described herein, LSV compensation logic 202 uses the aircraft speed signal and the acceleration signal to generate and output a compensating pressure command to mitigate axle oscillation.

Low speed brake control architecture 200 may further comprise a pressure command selector 204. In operation, pressure command selector 204 is configured to receive the compensating pressure command from the LSV compensating logic. Pressure command selector 204 is further configured to receive a pedal pressure command (e.g., a pressure command based upon a deflection angle of a brake pedal in the cockpit of the aircraft, such as left pilot brake pedal 14*l* and right pilot brake pedal 14*r*). Pressure command selector 204 may be configured to send either the compensating pressure command or the pedal pressure command to a pressure control 206, depending on which pressure command is lower. Stated differently, pressure command selector 204 may be configured to output the lower pressure command of these two inputs. In this regard, in response to the compensating pressure command being less than the pedal pressure command, the pressure command selector 204 sends the compensating pressure command to the pressure control 206. Conversely, in response to the compensating pressure command being greater than the pedal pressure command, the pressure command selector 204 sends the pedal pressure command to the pressure control 206.

BCU 150 may further comprise a pressure control 206. Pressure control 206 may be configured to receive the pressure command from pressure command selector 204 and output a current command associated with the commanded pressure to servo valve 42. In various embodiments, servo valve 42 is similar to servo valve 42*l* and/or servo valve 42*r*. As described herein with respect to FIG. 1C, servo valve 42 is actuated via the current command to vary hydraulic pressure acting on the brakes of the aircraft. Braking may be controlled by pressure control 206 during a braking maneuver of the aircraft in a closed-loop fashion based upon pressure feedback signals (e.g., via pressure sensors 48, with momentary reference to FIG. 1C).

Having described the general operation of low speed brake control architecture 200, details of the LSV compensation logic 202 is detailed with reference now to FIG. 3A.

Figure 3A:
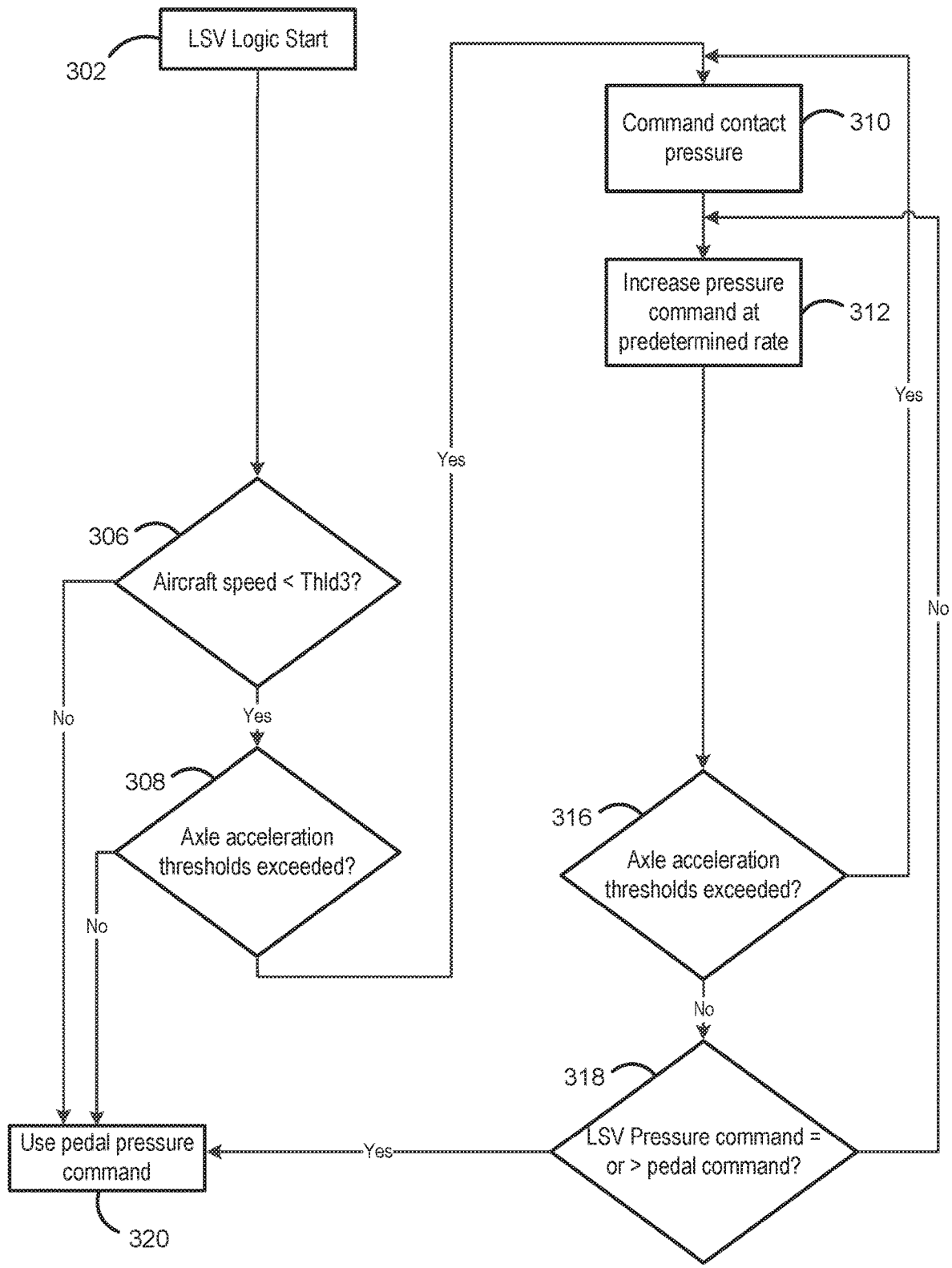
FIG. 3A is a flowchart of a method for low speed brake control, in accordance with various embodiments.

Referring now to FIG. 3A, a method for brake control at low speeds is provided. The method of FIG. 3A may be implemented by LSV compensation logic 202. More specifically, the method begins in a step 302, after which it is determined whether an aircraft speed is less than a threshold speed value (Thld3), such as ten knots for example, at a step 306. In various embodiments, with combined reference to FIG. 1C and FIG. 3A, the aircraft speed is determined based upon a wheel speed signal received via wheel speed sensor 27. However, any suitable method of determining aircraft speed is within the scope of the present disclosure. In various embodiments, the threshold speed value (Thld3) is ten knots or greater, such as between ten knots and twenty knots for example, depending on the aircraft speed at which the wheel speed signal becomes unreliable. In response to the BCU 150 determining that the aircraft speed is not below the threshold value at step 306, the low speed brake control process proceeds to step 320, wherein the pedal pressure command received by pressure command selector 204 is used for commanding braking pressure. In response to the BCU 150 determining that the aircraft speed is below the threshold value, the BCU 150 may begin monitoring landing gear axle acceleration and the method may proceed to step 308.

It is further determined, at step 308, whether an axle acceleration threshold is exceeded. BCU 150 may receive acceleration feedback signals from acceleration sensor 75. BCU 150 may determine whether an acceleration magnitude (i.e., either acceleration or deceleration) of an aircraft axle is greater than a threshold value. In various embodiments, the acceleration threshold value is 1 g (i.e., approximately 32.2 f/s$^2$ or 9.81 m/s$^2$ at sea level). In various embodiments, the acceleration threshold value is 0.5 g (i.e., approximately 16.1 f/s$^2$ or 4.905 m/s$^2$ at sea level). In various embodiments, the acceleration threshold value is 0.25 g (i.e., approximately 8.05 f/s$^2$ or 2.45 m/s$^2$ at sea level). In response to the BCU 150 determining that an axle acceleration does not exceed the acceleration threshold, the low speed brake control process proceeds to step 320, wherein the pedal pressure command received by pressure command selector 204 is used for commanding braking pressure.

In response to the BCU 150 determining that the aircraft speed is both below the threshold value at step 306, and that an axle acceleration exceeds the acceleration threshold at step 308, the low speed brake control process proceeds to step 310. Step 310 may include commanding, by the BCU 150, a contact pressure. As used herein, the term "contact pressure" refers to the pressure applied to the brakes (i.e., hydraulic pressure acting on actuators 28 via servo valve 42) at which the actuators 28 begin applying torque to the brake stack 26. In various embodiments, the contact pressure is the minimum pressure in the brakes that will not apply torque. In various embodiments, the contact pressure is between 100 psi and 300 psi (689.5 kPa-2068 kPa). However, the contact pressure may vary depending on the brake design. After the contact pressure is commanded at step 310, the BCU 150 may increase the pressure command at a predetermined rate at step 312. In various embodiments, the predetermined rate is between 150 psi/s and 350 psi/s. In this regard, the BCU 150 drops the pressure to the contact pressure at step 310, and then ramps up the pressure at step 312 at a predetermined rate until the pressure reaches the originally commanded pressure (i.e., the brake pedal command pressure or autobrake command pressure). The axle acceleration may be continuously monitored throughout the process (see step 316). In response to the axle acceleration increasing above the threshold at step 316, the command pressure may be dropped again to the contact pressure and the process restarts at step 310. In response to the axle acceleration not exceeding the threshold at step 316, the process continues to step 318. At step 318 the BCU 150 determines whether the pressure command (also referred to herein as the LSV pressure command) is equal to or greater than the pedal command. This logic at step 318 may be similar to pressure command selector 204 of FIG. 2. In various embodiments, step 318 is performed via pressure command selector 204. In response to the LSV pressure command being equal to or greater than the pedal command, the process proceeds to step 320 and again utilizes the pedal pressure command for applying the braking force to the aircraft. In various embodiments, step 320 is performed via pressure command selector 204 (see FIG. 2). Because pressure command selector 204 constantly compares the pedal command and LSV command and chooses the lower pressure of the two, the LSV logic 202 may remove itself from competing with the pedal pressure command by commanding a high brake pressure (e.g., 3000 psi) such that the pressure command selector is sure to choose the pedal pressure command if the axle acceleration does not exceed the threshold at step 316.

Figure 3B:
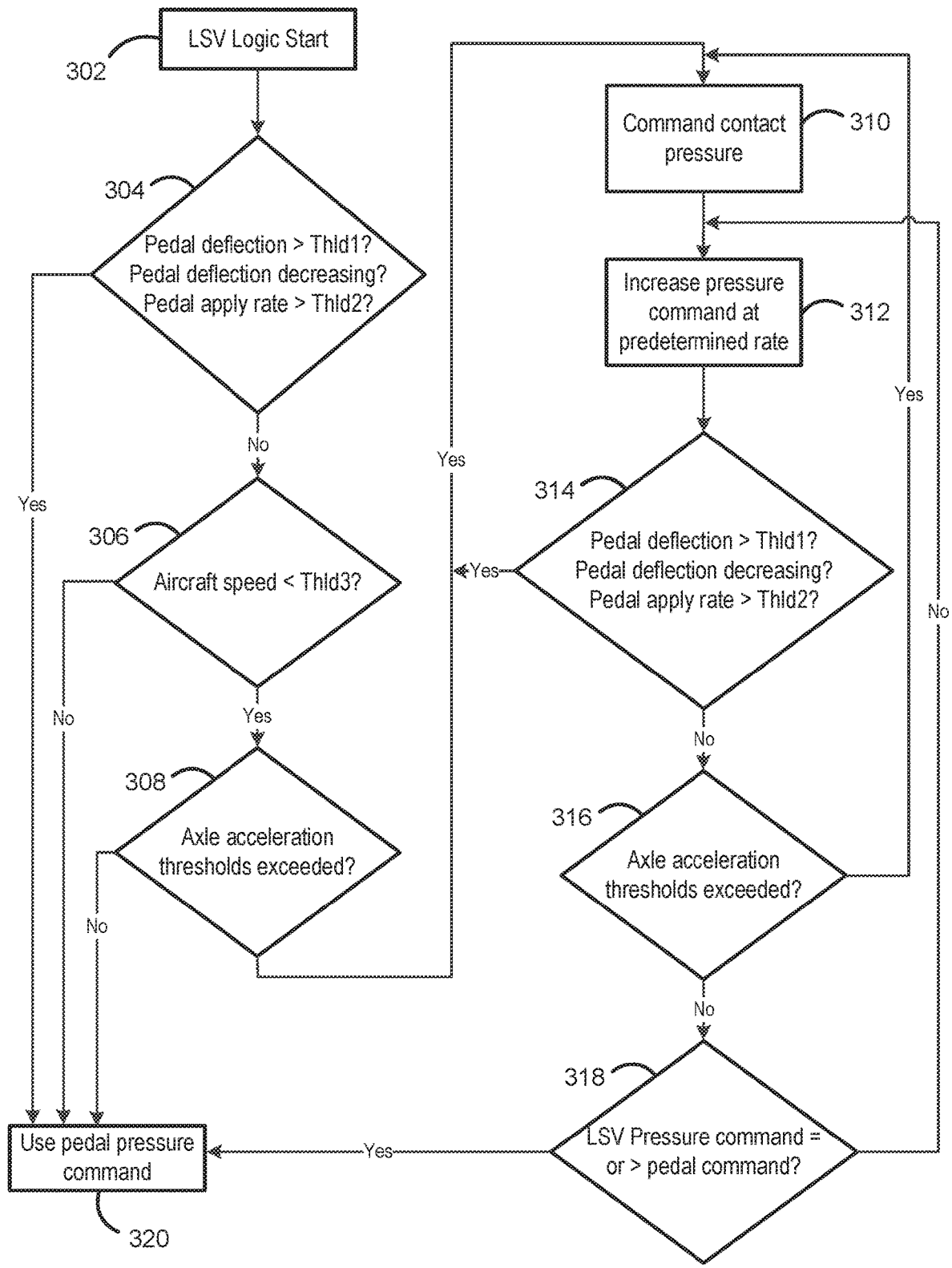
FIG. 3B is a flowchart of a method for low speed brake control with emergency brake control override, in accordance with various embodiments.

With reference to FIG. 3B, a method for brake control at low speeds is provided. The method of FIG. 3B is similar to the method of FIG. 3A, except that the method of FIG. 3B further includes step 304 and step 314. In this regard, with respect to FIG. 3B, elements with like element numbering, as depicted in FIG. 3A, are intended to be the same and will not necessarily be repeated for the sake of clarity. In general, at step 304 and step 314, the BCU 150 implements an override logic to determine whether to continue the process of FIG. 3B, or to revert back to the pedal command pressure. More particularly, at step 304 and step 314, the BCU 150 may monitor a position of a brake pedal to determine whether to revert back to the pedal command pressure.

In various embodiments, at step 304 and step 314, the BCU 150 determines whether a brake pedal deflection is greater than a threshold deflection (Thld1). In various embodiments, the threshold deflection (Thld1) may be a deflection of greater than 50%, in accordance with various embodiments, of greater than 60%, in accordance with various embodiments, of greater than 70%, in accordance with various embodiments, of greater than 80%, in accordance with various embodiments, of greater than 90%, in accordance with various embodiments, or any other desired deflection. In response to the brake pedal deflection being greater than the threshold deflection (Thld1), the process proceeds to step 320. In this manner, in response to a pilot, or co-pilot, pressing a pedal past the threshold deflection, the BCU 150 automatically reverts back to the pedal pressure command.

In various embodiments, at step 304 and step 314, the BCU 150 determines whether a brake pedal deflection is decreasing (i.e., whether a pilot or co-pilot is releasing the brake pedal). In response to the brake pedal deflection decreasing, the process proceeds to step 320.

In various embodiments, at step 304 and step 314, the BCU 150 determines whether a brake pedal apply rate is greater than a threshold rate (Thld2). (i.e., whether a pilot or co-pilot is pressing quickly on the brake pedal). In response to the brake pedal apply rate being greater than the threshold rate, the process proceeds to step 320 to revert back to the pedal pressure command.

In various embodiments, the BCU 150 may implement one, two, or all three of the override logics described above at step 304 and step 314. Furthermore, other override logics may be implemented to determine whether to decrease braking pressure for low speed oscillation mitigation, or to use a pedal pressure command for safety purposes.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one, and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B, and C may be present in a single embodiment; for example, A and B, A and C, B and C, or A and B and C. Different cross-hatching is used throughout the figures to denote different parts, but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are only illustrated in the figures to help to improve understanding of embodiments of the present, representative disclosure.

Any reference to attached, fixed, connected, or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas, but not necessarily to denote the same or different materials. In some cases, reference coordinates may be specific to each figure.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements, but it may also include other elements not expressly listed or inherent to such process, method, article, or apparatus.

What is claimed is:

1. A brake control system, comprising:
    an accelerometer coupled to an axle;
    a servo valve configured to receive a hydraulic fluid and provide the hydraulic fluid to apply a braking force to a wheel via a hydraulic line; and
    a brake control unit in electronic communication with the servo valve;
    wherein the brake control unit is configured to:
        receive an axle acceleration signal indicative of at least one of an axle acceleration or an axle deceleration from the accelerometer;
        determine whether an aircraft speed is less than a threshold speed value;
        monitor acceleration oscillations by determining whether the axle acceleration is greater than a threshold acceleration value, in response to the aircraft speed being less than the threshold speed value, and determining whether the axle deceleration is greater than the threshold acceleration value, in response to the aircraft speed being less than the threshold speed value; and
        decrease a braking command pressure in response to the axle acceleration and the axle deceleration being greater than the threshold acceleration value, wherein the braking force applied to the wheel is reduced in response to the brake control unit decreasing the braking command pressure.

2. The brake control system of claim 1, wherein the brake control unit is further configured to increase the braking command pressure at a predetermined rate.

3. The brake control system of claim 2, wherein the brake control unit is further configured to:
    determine whether the braking command pressure is equal to or greater than a pedal command pressure; and switch from using the braking command pressure to using the pedal command pressure, in response to the braking command pressure being equal to or greater than the pedal command pressure.

4. The brake Control system of claim 1, wherein the brake Control unit is further configured to decrease the braking command pressure to a contact pressure in response to the axle acceleration being greater than the threshold acceleration value.

5. The brake control system of claim 1, wherein the brake control unit is further configured to:
monitor a brake pedal position to determine whether at least one of:
i) a pedal deflection is greater than a threshold deflection value;
ii) a pedal deflection is decreasing; and
iii) a pedal apply rate is greater than a threshold apply rate; and
switch from using the braking command pressure to using a pedal command pressure, in response to at least one of a criteria in i)-iii) being true.

6. The brake control system of claim 3, wherein the brake control unit is further configured to continue increasing the braking command pressure at the predetermined rate, in response to the braking command pressure being less than the pedal command pressure.

7. A method for brake control, comprising:
receiving, by a brake control unit, an axle acceleration signal indicative of at least one of an axle acceleration or an axle deceleration from the accelerometer;
determining whether an aircraft speed is less than a threshold speed value;
monitoring acceleration oscillations by determining whether the axle acceleration is greater than a threshold acceleration value, in response to the aircraft speed being less than the threshold speed value, and determining whether the axle deceleration is greater than the threshold acceleration value, in response to the aircraft speed being less than the threshold speed value; and
decreasing, by the brake control unit, a braking command pressure in response to the axle acceleration and the axle deceleration being greater than the threshold acceleration value, wherein a braking force applied to a wheel is reduced in response to the brake control unit decreasing the braking command pressure.

8. The method of claim 7, further comprising increasing, by the brake control unit, the braking command pressure at a predetermined rate.

9. The method of claim 8, further comprising:
determining, by the brake control unit, whether the braking command pressure is equal to or greater than a pedal command pressure; and
switching, by the brake control unit, from using the braking command pressure to using the pedal command pressure, in response to the braking command pressure being equal to or greater than the pedal command pressure.

10. The method of claim 7, further comprising decreasing, by the brake control unit, the braking command pressure to a contact pressure in response to the axle acceleration being greater than the threshold acceleration value.

11. The method of claim 7, further comprising:
monitoring, by the brake control unit, a brake pedal position to determine whether at least one of:
i) a pedal deflection is greater than a threshold deflection value;
ii) a pedal deflection is decreasing; and
iii) a pedal apply rate is greater than a threshold apply rate; and
switching, by the brake control unit, from using the braking command pressure to using a pedal command pressure, in response to at least one of a criteria in i)-iii) being true.

12. A brake control system that is configured for use with an aircraft, comprising:
a brake control unit comprising a processor; and
a tangible, non-transitory memory configured to communicate with the processor, the tangible, non-transitory memory having instructions stored thereon that, in response to execution by the processor, cause the brake control unit to perform operations comprising:
receiving an axle acceleration signal indicative of at least one of an axle acceleration or an axle deceleration from the accelerometer;
determining whether an aircraft speed is less than a threshold speed value;
monitoring acceleration oscillations by determining whether the axle acceleration is greater than a threshold acceleration value, in response to the aircraft speed being less than the threshold speed value, and determining whether the axle deceleration is greater than the threshold acceleration value, in response to the aircraft speed being less than the threshold speed value; and
decreasing a braking command pressure in response to the axle acceleration and the axle deceleration being greater than the threshold acceleration value, wherein a braking force applied to a wheel of the aircraft is reduced in response to the brake control unit decreasing the braking command pressure.

13. The brake control system of claim 12, wherein the instructions cause the brake control unit to perform further operations comprising:
increasing the braking command pressure at a predetermined rate.

14. The brake control system of claim 11, wherein the instructions cause the brake control unit to perform further operations comprising:
determining whether the braking command pressure is equal to or greater than a pedal command pressure; and
switching from using the braking command pressure to using the pedal command pressure, in response to the braking command pressure being equal to or greater than the pedal command pressure.

15. The brake control system of claim 12, wherein the brake control unit is configured to decrease the braking command pressure to a contact pressure in response to the axle acceleration being greater than the threshold acceleration value.

16. The brake control system of claim 12, wherein the instructions cause the brake control unit to perform further operations comprising:
monitoring a brake pedal position to determine whether at least one of:
i) a pedal deflection is greater than a threshold deflection value;
ii) a pedal deflection is decreasing; and
iii) a pedal apply rate is greater than a threshold apply rate; and
switching from using the braking command pressure to using a pedal command pressure, in response to at least one of a criteria in i)-iii) being true.

17. The brake control system of claim 14, wherein the instructions cause the brake control unit to perform further operations comprising:

increasing the braking command pressure at the predetermined rate, in response to the braking command pressure being less than the pedal command pressure.

\* \* \* \* \*